Aug. 19, 1952 G. H. RIDINGS ET AL 2,607,654

STYLUS ASSEMBLY FOR FACSIMILE RECORDERS

Filed Jan. 15, 1949

INVENTORS
G. H. RIDINGS
J. H. HACKENBERG

BY A. A. Thomas

ATTORNEY

Patented Aug. 19, 1952 2,607,654

UNITED STATES PATENT OFFICE 2,607,654

STYLUS ASSEMBLY FOR FACSIMILE RECORDERS

Garvice H. Ridings, Summit, N. J., and John H. Hackenberg, Flushing, N. Y., assignors to The Western Union Telegraph Company, New York, N. Y., a corporation of New York Application January 15, 1949, Serial No. 71,122

17 Claims. (Cl. 346—139)

The present invention relates to electric scanning mechanisms for facsimile machines (transmitters and recorders) and its main object is to provide a novel mounting for an electric stylus possessing certain practical advantages not found in prior devices of that kind.

In certain types of facsimile machines used by customers for transmitting and receiving messages, the subject copy or recording blank is mounted on a rotary drum which is driven in a forward direction for scanning by an electric stylus. The latter is supported on a slidable carriage which the customer throws back to remove the stylus from the paper and clear the drum for loading and unloading. When the machine is not running, the drum is free to be turned by hand in either direction so as to make it easier for the patron to mount a sheet for scanning and remove a scanned sheet.

It has been found that users of those machines will sometimes turn the drum backward without removing the stylus from the paper. This has resulted in bending or otherwise damaging the stylus and thereby putting the machine out of commission until it could be repaired. To overcome this difficulty and objection we have devised a stylus assembly in which the stylus is suspended on a spring arm in such a way that it automatically swings in a reverse direction when the drum is turned backward, so that no damage is done to the stylus.

Another practical advantage of our novel stylus mounting lies in the fact that its low inertia prevents vibration of the stylus as it rides over the paper on the revolving drum where slight irregularities in the cylindrical surface occur. In prior scanners of this type, where the stylus is carried by a weighted arm or similar support to give the required contact pressure on the stylus point, the stylus arm has considerable inertia which tends to vibrate the stylus and thereby cause imperfect scanning. This serious objection is effectively overcome by the stylus assembly herein disclosed.

One embodiment of our invention as actually constructed and operated is illustrated in the accompanying drawings, in which—

Figures 2, 5, 6:
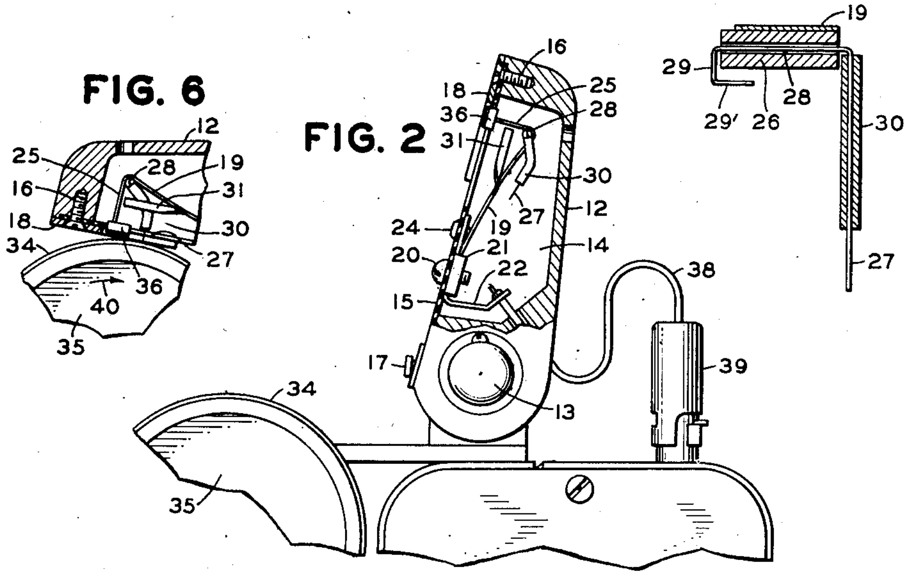
Fig. 2 shows the stylus assembly thrown back to permit loading and unloading of the drum.
Fig. 5 is a sectional view greatly exaggerated for clearness showing how the stylus wire is pivotally suspended on the supporting spring arm.
Fig. 6 illustrates how the swinging stylus flops over when the drum is turned backward.

For convenience of description let us consider that our new stylus assembly is incorporated in a facsimile machine like that shown in the pending application of Ridings et al., Serial No. 33,354, filed June 16, 1948. So we need only say here that the casing 12, which supports the stylus assembly as a unit, is a carriage slidably and pivotally mounted on a fixed guide rod 13, as fully set forth in the application referred to. It will be understood, then, that the casing 12 slides along the rod 13 during a scanning operation (Fig. 1) and can be thrown back to rest position as shown in Fig. 2.

The casing or carriage 12 is a hollow metal casting with a chamber 14 in which the stylus assembly is set by means of an insulating base plate 15. This plate, which may be a thin strip of "Bakelite," is removably attached to the bottom of casing 12 in any practical way, as by a screw 16 and a pin 17. A slotted metal piece 18 is secured by the screw 16 to the front end of casing 12 beneath the insulating plate 15 for a purpose to be explained later.

A spring arm 19 is fixed at one end to plate 15 by a screw 20 and a nut 21, which is channeled on the underside to receive the spring arm and clamp it against lateral movement. The arm 19 is a strip of good spring metal (such as beryllium copper or Phosphor bronze) and is made so thin and light as to be readily flexible and of low inertia. To increase the flexibility of arm 19 in the vertical plane and at the same time retain a measure of rigidity in other directions, it may be formed with holes 23 near its supported end. A right angled terminal piece 22 (of brass or the like) also passes through the channeled nut 21 below the arm 19, which is thereby held in pressure contact with the terminal piece 22 to form a good conducting joint. An additional rivet 24 may be used to fasten the forward end of terminal piece 22 to the insulating base plate 15.

The spring arm 19 is bent down at its forward end to provide a depending extension 25 and in the angle thus formed there is secured (as by solder or otherwise) a small metal tube 26 in which a stylus 27 is pivoted for easy swinging movement. The stylus 27 is a piece of tungsten or steel wire bent into L-shape to provide a vertical arm for scanning contact and a lateral extension 28 which passes through the tube 26. The short projecting end 29 is bent over to prevent the stylus from sliding out of the tube 26 while leaving it free to pivot. This simple mounting of the stylus wire makes it easy to insert and remove a stylus. The depending arm of the stylus wire is bent slightly forward at the proper scanning angle. To strengthen this part of the wire and also to provide sufficient weight to insure proper pivoting, we enclose it in a metal sheath 30, which is preferably a little copper tube flattened in the swinging plane of the suspended stylus. The end 29 of the stylus wire can, if desired, be bent back at 29′ (Fig. 5) to serve as a back stop for the swinging stylus when the carriage is raised, as shown in Fig. 2.

Figure 1:
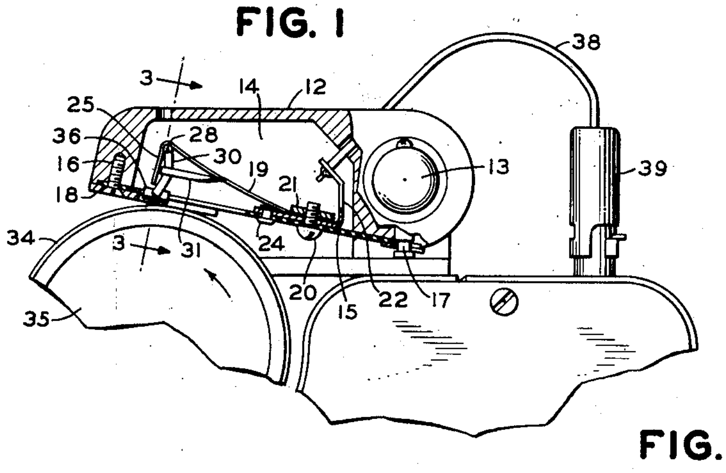
Fig. 1 shows the stylus assembly in longitudinal cross-section, with the stylus in scanning position.

The stylus supporting arm 19 is slit lengthwise to provide an integral strip 31 which is bent at right angles to an arm and terminates in a U-shaped hook 32 through which the stylus 27 freely extends. The front end of hook 32 acts as a stop to limit the forward swing of the stylus and hold it firmly at the correct scanning angle, as shown in Fig. 1, where the stylus point is to the left of the pivot point 28. The base plate 15 has an opening 33 through which the stylus extends into contact with a sheet 34 mounted on the rotary drum 35. During a scanning operation the drum rotates forward or counterclockwise, as viewed in Fig. 1, so that the stylus 27 is pressed against the stop 32 and held in scanning position.

Figure 4:
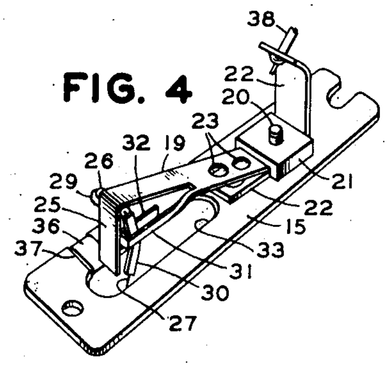
Fig. 4 is a perspective of the stylus mounting removed from the supporting carriage.
Figure 3:
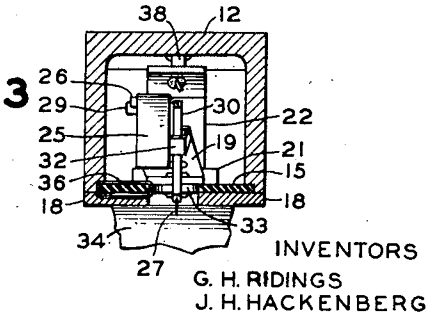
Fig. 3 is an enlarged section on line 3—3 of Fig. 1.

The insulated base plate 15 carries a contact 36 which may be a thin copper strip wound in a groove 37 of the plate, as shown in Figs. 3 and 4. The metal piece 18, which is fastened to the bottom of casing 12, touches the contact 36 and since the casing is grounded to the machine it is clear that the contact 36 is a permanently grounded terminal.

When the carriage 12 is in thrown-back position as shown in Fig. 2, the inherent tension of spring arm 19 presses the end of extension 25 against the grounded contact 36, whereby the entire stylus assembly is grounded and can be safely touched by the operator. Owing to its pivotal suspension, the stylus 27 now hangs like a pendulum within the chamber 14. Upon lowering of the carriage 12 to scanning position (Fig. 1), the pendulous stylus automatically swings down through the slot 33 into contact with the paper 34 on drum 35 either for transmitting or recording.

During a scanning operation the carriage 12 rests at its front end on the paper, with the metal plate 18 acting as a shoe to hold the paper smooth in advance of the stylus along the scanning line, as will be clear from Fig. 3. The shoe 18 is slotted in line with slot 33 of base plate 15 to permit passage of the stylus therethrough. Although the carriage rests on the paper, the pressure on the stylus point is wholly independent of the carriage weight, for the stylus pressure depends solely on the tensioned spring arm 19.

It should be noted that in its scanning position the stylus pushes the arm 19 up and thereby disconnects it from the grounded contact 36, so that the stylus circuit is placed in operative condition. At the same time the raised position of spring arm 19 causes it to exert the desired constant pressure on the stylus tip which is thereby held in firm contact with the paper.

A flexible conductor 38, which is sufficiently long to allow free movement of the stylus carriage 12, connects the contact piece 22 with a suitable plug 39 mounted on the machine. In this way the insulating stylus assembly on plate 15 is permanently connected to the insulated terminal 39 which forms a connector in the operating circuits of the machine.

When the user of the machine wants to remove a scanned sheet, he should first take the stylus off the paper by throwing the carriage back to the position shown in Fig. 2. However, since the drum 35 turns either way when the machine is not running, a person may thoughtlessly turn the drum backward, as indicated by the arrow 40 in Fig. 6, while the stylus is still in contact with the paper. In the use of prior stylus mountings, such backward rotation of the drum would bend the stylus and make further operation of the machine impossible until a new stylus was inserted. This necessitated the removal of the entire stylus assembly from the scanning carriage.

Now, the stylus assembly of the present invention allows the stylus to swing back harmlessly with the backward movement of the drum. In other words, the pivotal mounting of stylus 27 on the spring arm 19 operates as a toggle which lets the stylus occupy a forwardly slanting position for scanning, as shown in Fig. 1, and a rearwardly slanting position (Fig. 6) when the drum is turned the wrong way. Let it be observed that in its rearward position the stylus is grounded to contact 36 because the extension 25 of spring arm 19 is touching the grounded contact 36.

The extremely light weight of the stylus assembly has the important advantage of preventing the stylus from vibrating while in contact with the paper during a scanning operation. Should the stylus encounter irregularities (such as minute depressions or elevations) on the cylindrical surface of the rapidly revolving paper, any tendency of the stylus to vibrate is minimized (if not entirely suppressed) by the low inertia of the stylus mounting as a unit. The practical result of this non-vibrating characteristic of our new stylus assembly is a better recording of the transmitted subject matter.

While we have shown and described a certain construction of stylus assembly containing our invention, it is apparent that the basic idea herein disclosed can be embodied in various ways within the scope of the appended claims.

We claim as our invention:

1. A scanning device for a facsimile machine comprising a casing mounted to occupy a horizontal scanning position and a thrown-back inoperative position, a slotted plate carried by said casing, a spring arm mounted at one end on said plate and extending lengthwise in said casing, the other end of said arm being movable up and down, a stylus pivotally suspended at its upper end on the movable end of said spring arm, said pivotal suspension of the stylus including a pin on which the stylus is free to swing forward by gravity through said slotted plate into scanning position when the casing is horizontal and to swing back into the casing when the latter is tilted up, and means to limit the forward swinging movement of said stylus to hold it at the correct scanning angle.

2. A stylus assembly for a facsimile machine having a base plate provided with an opening, a spring arm connected at one end to said plate and movable at its free end toward and away from said base plate, the free end of said arm being normally urged toward the base plate, a stylus pivotally suspended at its upper end on the free end of said spring arm, whereby said stylus extends downward through said slotted plate to assume a scanning position in which the stylus point lies to the front of the suspension axis, and means for limiting the forward swinging movement of said stylus to determine its scanning angle, said pivotal suspension of the stylus being automatically yieldable in the direction of the stylus axis to cause the stylus to swing freely backward to a position in which the stylus point lies to the rear of the suspension axis.

3. A stylus assembly for facsimile scanning, comprising a spring arm supported at one end, a stylus pivotally suspended on the free end of said arm so as to swing by gravity into and out of scanning position, and means for limiting the swing of the stylus into scanning position so as to hold it rigidly at a predetermined scanning angle.

4. An electric scanning stylus for facsimile machines consisting of a piece of thin wire bent approximately at right angles to provide a horizontal top portion for pivotally suspending the stylus and a pendulous portion adapted to engage a sheet at the proper scanning angle, and a flat metal sheath mounted on said pendulous portion to increase the inertia thereof for easy swinging by gravity about its pivotal suspension, said metal sheath being flattened in the swinging plane of the stylus to form a rigid holder for the resilient scanning point projecting from said sheath.

5. A scanning device for use on a sheet holding drum rotatable forward for scanning and adapted to be turned backward, said device comprising a stylus adapted to engage a sheet in scanning contact when the drum rotates forwardly, and a pivotal spring support for said stylus self-adjustable in the direction of the stylus axis to allow the stylus to swing backward automatically when the drum is turned backward while the stylus is in contact with the supported sheet.

6. A scanning device for use on a sheet holding drum rotatable forward for scanning and adapted to be turned backward, said device comprising a stylus adapted to engage a sheet on the drum in scanning contact, a pendulous spring mounting for said stylus, said spring mounting including a pivot pin on which the upper end of the stylus is suspended so that the pendulous stylus swings forward for scanning with the forward rotation of the drum, said pivot pin being so positioned that the pendulous stylus swings automatically backward with backward rotation of the drum when the stylus is left in contact with the paper, and a stop for limiting the forward swing of the stylus to hold it at the proper scanning angle.

7. A facsimile scanning device comprising a metallic carriage, an insulated stylus mounted on said carriage, a pivoted toggle mounting for said stylus which is adapted to swing over to either side of the toggle pivot, and means for automatically grounding the stylus to said carriage when the stylus swings to one side of its pivot and automatically ungrounding the stylus when it swings to the other side of its pivot.

8. An insulated stylus assembly for a facsimile machine comprising an insulating plate provided with an opening, a metal spring arm rigidly secured at one end to said plate and extending upward at its free end, a stylus pivoted at its upper end on the free end of said arm and extending downward through said opening in the plate to assume a scanning position, said depending stylus being free to swing in either direction, means for limiting the swinging movement of said stylus in a forward direction to cause it to assume a predetermined scanning position, said stylus being free to swing in a reverse direction, a grounded contact carried by said insulating plate, and an extension on said spring arm arranged to engage said contact when the stylus is out of scanning position, said extension being held away from said contact by the stylus in its scanning position.

9. A stylus assembly for facsimile scanning, comprising a plate, a spring arm mounted at one end on said plate, said spring arm being split lengthwise to provide a first section having a downward extension and a second section having a lateral extension, a tube secured in the angle formed by the extension on the first section, and a stylus element comprising an L-shaped piece of wire which has one portion pivoted in said tube and the other portion free to swing in a vertical plane forward and backward, said lateral extension on the second section of the spring arm forming a stop to limit the forward swing of the stylus.

10. A facsimile scanning device for use on a drum rotatable forward for scanning and adapted to be turned backward, said device comprising a base member, a spring arm mounted at one end on said base member and movable at the other end toward and away from the drum, a pin on the movable end of said arm which is normally urged toward the drum, and a stylus pivotally suspended from said pin and held by said spring arm in scanning position on the drum with the stylus point located to one side of said pin which constitutes a vertically yieldable pivot, whereby the suspended stylus swings automatically to the other side of the pin upon reversal of the drum.

11. A facsimile scanning device comprising a pivotally mounted casing adapted to occupy a horizontal scanning position and an upright rest position, stylus-supporting means in said casing provided with a pivot axis and a depending stylus pivoted at its upper end on said axis and free to swing by gravity from one side of said axis to the other when the casing is moved from one position to the other, said pivot axis being so located that the swing of the pendulous stylus by the casing movement causes the stylus tip to project through the casing when the latter is in scanning position and to withdraw automatically into the casing when the latter is raised to rest position.

12. A facsimile scanning device comprising a casing mounted to occupy a horizontal scanning position and an upright rest position, supporting means in said casing to provide a pivot, a pendulous stylus hung on said pivot so as to swing thereon by gravity and project at its tip out of the casing for scanning, and means for limiting the forward swing of said stylus to hold it in scanning position, said pivot being so located that the stylus swings backward by gravity into the casing when the latter is raised to rest position.

13. A facsimile scanning device for use on a drum rotatable forward and backward, said device comprising a pivotally mounted casing adapted to occupy a horizontal scanning position and an upright rest position, an arm in said casing provided with a yieldable pivot, a depending stylus hung on said pivot so as to swing thereon by gravity, the scanning tip of said stylus projecting through the casing when the latter is in horizontal position, and means in said casing to limit the forward swing of said stylus and hold it in scanning position, said yieldable pivot being so located that a rearward turning of the drum automatically causes the stylus tip to ride over the drum and swing to the rear of said pivot, whereby injury to the stylus is prevented, the location of said pivot causing the stylus to swing by gravity into the casing when the latter is raised to rest position.

14. In a facsimile machine having a horizontal scanning drum rotatably supported, a stylus assembly comprising a pivotally mounted support, a spring arm secured at one end to said support and carrying a pivot pin at its other end which is movable vertically, and a stylus pivotally suspended at its upper end on said pin so as to swing forward by gravity into scanning position on the drum, the tension of said spring arm holding the stylus in pressure contact with the drum and the free end of said spring arm constituting a resilient support for the pivot pin which enables the suspended stylus to swing backward on the drum when the latter is turned the wrong way, whereby injury to the stylus is prevented.

15. A facsimile scanning device for use on a horizontal drum rotatable forward and backward, said device comprising a stylus and a toggle mounting from which the stylus is suspended for free swinging movement, said toggle mounting having a yieldable pivot which causes the stylus tip to ride over the turning drum and swing from one side of said pivot to the other upon reversal of the drum, whereby injury to the stylus is prevented if the drum is turned the wrong way.

16. A facsimile scanning device for use on a horizontal drum rotatable forward and backward, said device comprising a stylus supporting axis yieldable in a vertical direction and a stylus pivotally suspended on its upper end on said axis so as to assume a trailing position during the forward rotation of the drum, said yieldable axis being so located with respect to the stylus tip that a rearward turning of the drum automatically causes the stylus tip to ride over the drum and swing to the rear of said pivot axis, whereby injury to the stylus is prevented.

17. A facsimile scanning device comprising a pivotally mounted casing arranged to occupy a horizontal scanning position and a thrown-back rest position, a pivot axis supported in said casing, and a stylus pivotally suspended at its upper end on said axis and free to swing by gravity in response to the movements of said casing from one position to the other, said suspension axis being so located that the stylus tip projects through the casing when the latter is in scanning position and automatically swings back into the casing when the latter is moved to rest position, whereby the stylus is completely enclosed and protected by the casing when the device is idle.

GARVICE H. RIDINGS.
JOHN H. HACKENBERG.

REFERENCES CITED

The following references are of record in the file of this patent:

UNITED STATES PATENTS

| Number | Name | Date |
|---|---|---|
| 1,702,595 | Cooley | Feb. 19, 1929 |
| 1,796,584 | Volmer | Mar. 17, 1931 |
| 2,184,973 | Finch | Dec. 26, 1939 |
| 2,391,145 | Finch | Dec. 18, 1945 |
| 2,401,350 | Hellmann | June 4, 1946 |
| 2,408,458 | Turner | Oct. 1, 1946 |
| 2,462,145 | Thomas | Feb. 22, 1949 |
| 2,475,785 | Jensen | July 12, 1949 |
| 2,496,861 | De Boer et al. | Feb. 7, 1950 |